US008694209B2

(12) United States Patent
Tokimasa et al.

(10) Patent No.: US 8,694,209 B2
(45) Date of Patent: Apr. 8, 2014

(54) APPARATUS FOR CONTROLLING MOTION OF VEHICLE

(75) Inventors: Mitsuhiro Tokimasa, Kariya (JP); Yoshihisa Ogata, Chiryu (JP); Daisuke Tokumochi, Kariya (JP); Masatoshi Hanzawa, Kariya (JP); Masayoshi Takeda, Kariya (JP)

(73) Assignees: Denso Corporation, Kariya (JP); Advics Co., Ltd., Kariya (JP)

( * ) Notice: Subject to any disclaimer, the term of this patent is extended or adjusted under 35 U.S.C. 154(b) by 496 days.

(21) Appl. No.: 12/931,385

(22) Filed: Jan. 31, 2011

(65) Prior Publication Data

US 2011/0196579 A1 Aug. 11, 2011

(30) Foreign Application Priority Data

Feb. 8, 2010 (JP) .................................. 2010-025426

(51) Int. Cl.
| | | |
|---|---|---|
| *B60T 8/34* | (2006.01) | |
| *G06F 17/00* | (2006.01) | |
| *G06F 19/00* | (2011.01) | |
| *B60T 8/58* | (2006.01) | |
| *B60K 31/02* | (2006.01) | |

(52) U.S. Cl.
USPC ............ 701/41; 701/48; 701/70; 701/79; 180/271; 180/333; 180/400; 303/121; 303/191

(58) Field of Classification Search
USPC ............ 701/1, 36, 41, 48, 49, 69, 70, 71, 72, 701/78, 79, 82, 89, 90, 91, 92; 303/121, 303/146, 147, 151, 152, 153, 154, 155, 165, 303/169, 189–191, 20; 180/197, 252, 271, 180/282, 315, 333, 334, 400
See application file for complete search history.

(56) References Cited

U.S. PATENT DOCUMENTS

| | | | | |
|---|---|---|---|---|
| 5,816,669 | A | * 10/1998 | Hiwatashi et al. | ............ 303/140 |
| 6,064,930 | A | * 5/2000 | Shibahata | ........................ 701/36 |
| 2007/0001510 | A1 | * 1/2007 | Miller | ............................ 303/149 |
| 2007/0294011 | A1 | * 12/2007 | Yasui et al. | ..................... 701/41 |

FOREIGN PATENT DOCUMENTS

| | | |
|---|---|---|
| EP | 1695894 | 8/2006 |
| JP | 2004-148890 | 5/2004 |

(Continued)

OTHER PUBLICATIONS

Office action dated Nov. 8, 2011 in corresponding JP Application No. 2010-025426.

*Primary Examiner* — Thomas Tarcza
*Assistant Examiner* — Edward Pipala
(74) *Attorney, Agent, or Firm* — Harness, Dickey & Pierce, PLC

(57) ABSTRACT

A vehicle motion controlling apparatus has an allocating unit for selecting steering or braking control mainly performed in cooperative control, receiving a desired value of vehicle turning motion, allocating steering and braking controls for the motion, determining main yaw rate from vehicle conditions, and determining a non-main yaw rate from difference between the desired value and the main yaw rate. Setting units set assist torque corresponding to the main yaw rate and braking torque corresponding to the non-main yaw rate when the steering control is selected and set braking torque corresponding to the main yaw rate and assist torque corresponding to the non-main yaw rate when the braking control is selected. The assist torque is generated for assisting a change of steering angle of vehicle in steering control. The braking torque is generated for applying braking force to wheel of vehicle in braking control.

7 Claims, 6 Drawing Sheets

(56) References Cited

FOREIGN PATENT DOCUMENTS

| JP | 2005-132172 | 5/2005 |
| JP | 2005-132280 | 5/2005 |
| JP | 2005-186762 | 7/2005 |
| JP | 2008-094214 | 4/2008 |
| JP | 2010-042741 | 2/2010 |
| WO | WO2009/113232 | 9/2009 |

\* cited by examiner

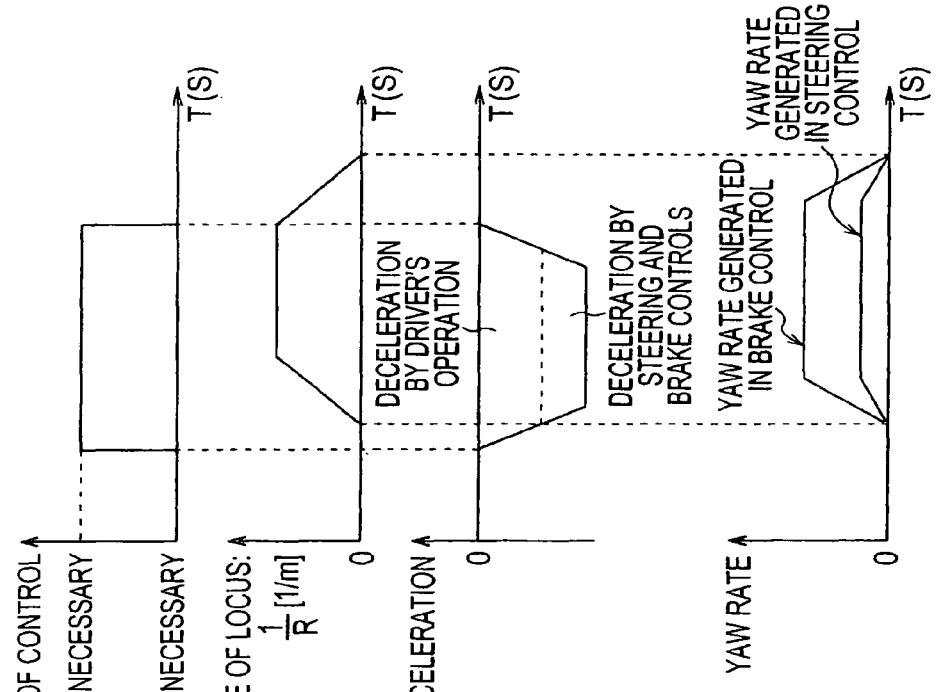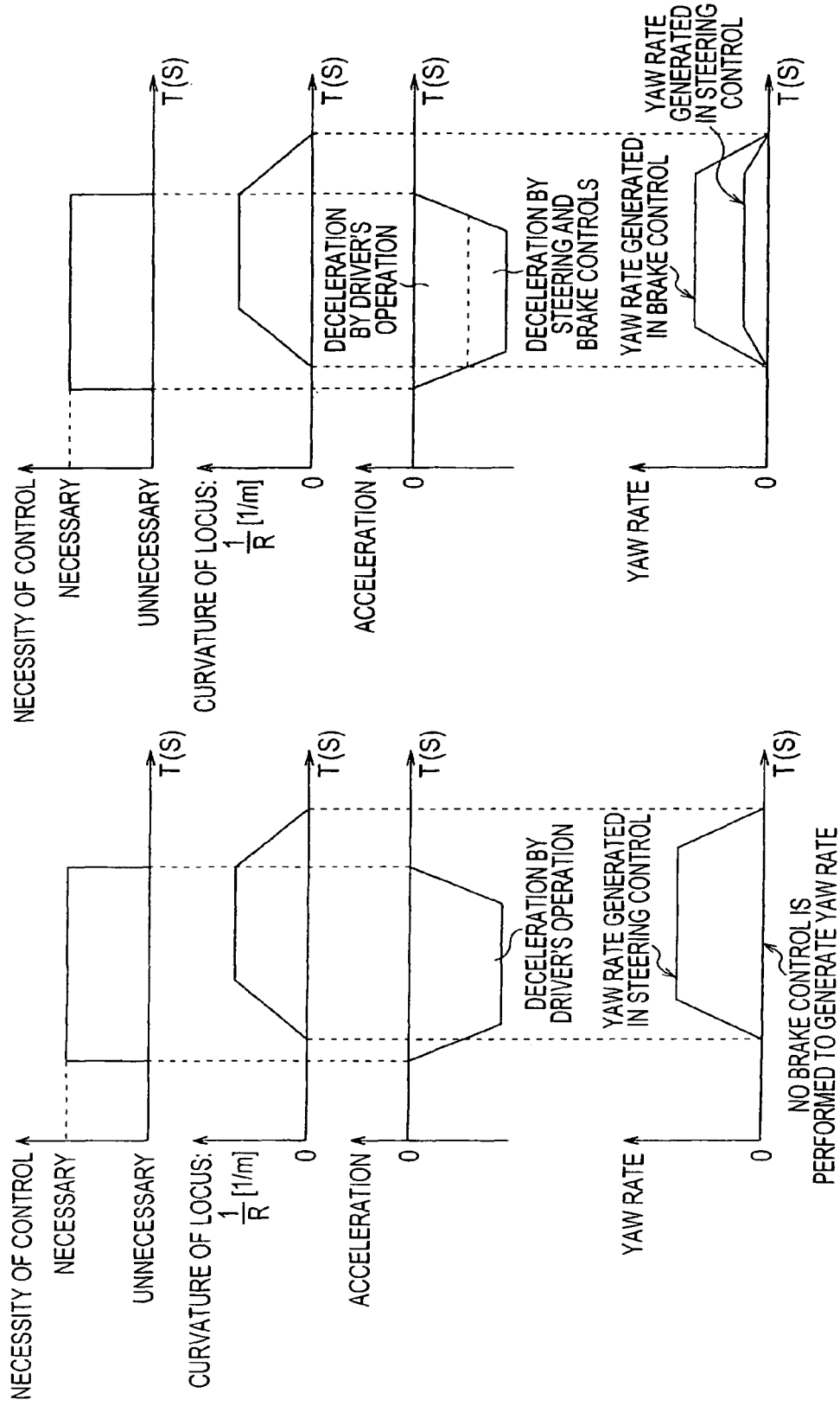

APPARATUS FOR CONTROLLING MOTION OF VEHICLE

CROSS-REFERENCE TO RELATED APPLICATION

This application is based upon and claims the benefit of priority of the prior Japanese Patent Application 2010-25426 filed on Feb. 8, 2010, so that the contents of which are incorporated herein by reference.

BACKGROUND OF THE INVENTION

1. Field of the Invention

The present invention relates to a vehicle motion controlling apparatus which cooperatively performs a steering control and a braking control for a vehicle to control the motion of the vehicle.

2. Description of Related Art

A vehicle has a steering angle control mechanism and a torque control mechanism. The steering angle control mechanism automatically controls the steering angle of front wheels independently of a driver's steering operation. The torque control mechanism automatically controls the transmission of a torque, generated in an internal combustion engine, to rear wheels through gears and a clutch disc. Published Japanese Patent First Publication No. 2008-94214 discloses a vehicle motion controlling apparatus for appropriately distributing controlled variables to these mechanisms. This apparatus decides these controlled variables to provide a vehicle motion matching to a normative yaw rate. This decision is automatically performed such that loads applied to the wheels are appropriately set when the vehicle is accelerated.

However, when the vehicle is, for example, turned while being decelerated, the apparatus cannot appropriately distribute controlled variables to the mechanisms. For example, when a driver of the vehicle having the apparatus finds out an object such as another vehicle suddenly driving out in front of the vehicle, the driver manually performs a turning operation and a deceleration operation to urgently avoid the object. Further, when the vehicle running on a downward path or running at a high speed goes into a corner of a road, the driver needs the apparatus automatically assisting the driver in decelerating the vehicle to turn the vehicle while decelerating the vehicle. In these cases, the mechanisms of the apparatus independently perform the steering control and the braking control for the vehicle. For example, only the steering angle control mechanism automatically performs the steering control at the urgently object avoiding time to turn the vehicle, or only the torque control mechanism automatically performs the braking control at the deceleration assisting time to decelerate the vehicle.

When the apparatus controls the vehicle motion by automatically performing only the steering control or only the braking control to urgently avoid the object or to assist the driver in decelerating the vehicle, it is required of the driver to manually operate a brake pedal or a steering wheel of the vehicle at a large manipulated variable. Therefore, a burden on the driver in driving the vehicle becomes large.

SUMMARY OF THE INVENTION

An object of the present invention is to provide, with due consideration to the drawbacks of the conventional vehicle motion controlling apparatus, a vehicle motion controlling apparatus which cooperatively performs a steering control and a braking control for a vehicle to lighten a burden on a driver.

According to an aspect of this invention, the object is achieved by the provision of a vehicle motion controlling apparatus comprising a control allocating unit, an assist torque setting unit, and a braking torque setting unit. The control allocating unit receives a selection of a steering control mainly performed for a vehicle turning motion or a selection of a braking control mainly performed for the vehicle turning motion, receives a desired value of the vehicle turning motion, allocates the steering control and the braking control for the vehicle turning motion, determines a main requested value of a controlled variable, indicating the vehicle turning motion, such that the main requested value of the controlled variable is achievable in the steering control in case of the selection of the steering control or is achievable in the braking control in case of the selection of the braking control, and determines a non-main requested value of the controlled variable, corresponding to a difference between the desired value of the vehicle turning motion and the main requested value of the controlled variable. The assist torque setting unit sets a specific assist torque corresponding to either the main requested value of the controlled variable incase of the selection of the steering control or the non-main requested value of the controlled variable incase of the selection of the braking control to generate the specific assist torque in a steering control performing unit which performs the steering control to assist a change of a steering angle of the vehicle at the specific assist torque. The braking torque setting unit sets a specific braking torque corresponding to either the main requested value of the controlled variable in case of the selection of the braking control or the non-main requested value of the controlled variable in case of the selection of the steering control to generate the specific braking torque in a braking control performing unit which performs the braking control to apply a braking force corresponding to the specific braking torque to a wheel of the vehicle.

With this structure of the apparatus, when receiving the selection of the steering control, the control allocating unit determines a main requested value of the controlled variable achievable in the steering control and a non-main requested value of the controlled variable corresponding to the difference between the desired value of the vehicle turning motion and the main requested value of the control led variable. The assist torque setting unit sets a specific assist torque corresponding to the main requested value, and the steering control performing unit performs the steering control for the vehicle by the specific assist torque. The braking torque setting unit sets a specific braking torque corresponding to the non-main requested value, and the braking control performing unit performs the braking control for the vehicle by the specific braking torque.

In contrast, when receiving the selection of the braking control, the control allocating unit determines a main requested value of the controlled variable achievable in the braking control and a non-main requested value of the controlled variable corresponding to the difference between the desired value of the vehicle turning motion and the main requested value of the controlled variable. The braking torque setting unit sets a specific braking torque corresponding to the main requested value, and the braking control performing unit performs the braking control for the vehicle by the specific braking torque. The assist torque setting unit sets a specific assist torque corresponding to the non-main requested value, and the steering control performing unit performs the steering control for the vehicle by the specific assist torque.

Therefore, because the main requested value of the controlled variable achievable in the steering or braking control is determined while the non-main requested value of the controlled variable corresponding to the difference between the desired value and the main requested value is determined, the steering control and the braking control can be appropriately allocated for the vehicle turning motion.

Accordingly, in the vehicle turning motion, because a cooperative control of the steering and braking controls is performed such that the steering control is mainly performed while the braking control supports the steering control, or such that the braking control is mainly performed while the steering control supports the braking control, a burden on the driver can be lightened.

Further, as compared with the case of performing only the steering control or only the braking control for the vehicle turning mot ion, the cooperative control of the steering and braking controls can be performed for the vehicle turning motion so as to precisely follow the target value of the vehicle turning motion.

BRIEF DESCRIPTION OF THE DRAWINGS

FIG. 7A is a timing chart showing a curvature in turning, an acceleration and a yaw rate applied to a vehicle only in the steering control according to the prior art; and FIG. 7B is a timing chart showing a curvature in turning, an acceleration and a yaw rate applied to a vehicle in the cooperative control according to this embodiment.

DETAILED DESCRIPTION OF THE PREFERRED EMBODIMENT

In this embodiment, a vehicle motion controlling system using a vehicle motion controlling apparatus will be described.

Figure 1:
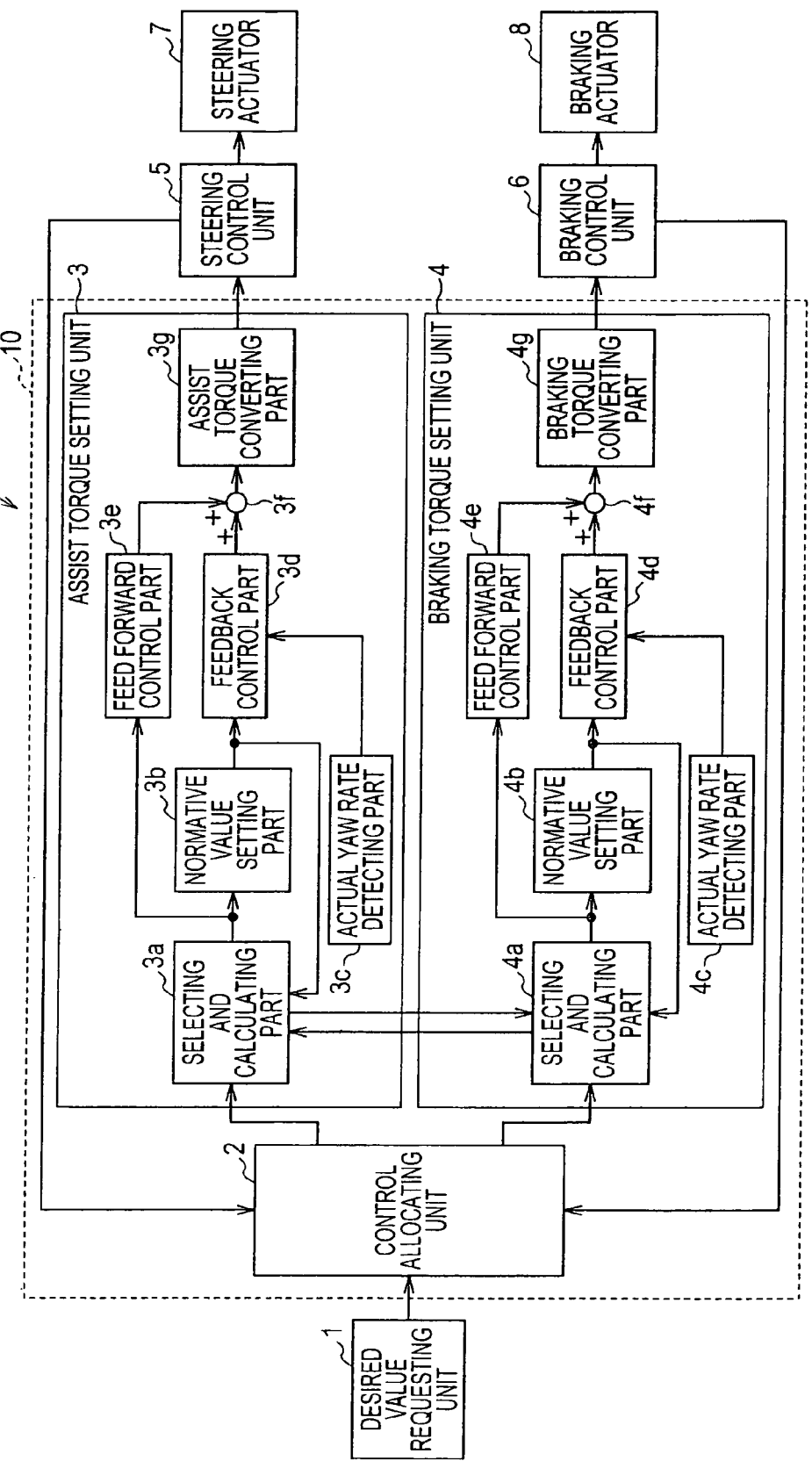
FIG. 1 is a block diagram of a vehicle motion controlling system having a vehicle motion controlling apparatus according to an embodiment of the present invention.

FIG. 1 is a block diagram of a vehicle motion controlling system having a vehicle motion controlling apparatus according to this embodiment. As shown in FIG. 1, the vehicle motion control system 100 mounted in a vehicle has a desired value requesting unit 1, a vehicle motion control apparatus 10, a steering actuator 7, a brake actuator 8, a steering control unit 5, and a braking control unit 6. The requesting unit 1 outputs a selection of a steering control mainly performed for a vehicle turning motion or a selection of a braking control mainly performed for the vehicle turning mot ion, requests a desired change pattern (i.e., a desired value) of the vehicle turning motion every control period of time. The vehicle motion control apparatus 10 determines a specific value of the assist torque (hereinafter, called a specific assist torque) and a specific value of the braking torque (hereinafter, called a specific braking torque) according to the selection of the steering or braking control sent from the requiring unit 1 such that the desired change pattern of the vehicle turning motion is achieved in a cooperative control of the steering and braking controls performed at the specific assist torque and the specific braking torque. The control unit 5 controls the actuator 7 to generate the specific assist torque in the steering control for the vehicle. The control unit 6 controls the actuator 8 to generate the specific braking torque in the braking control for the vehicle.

The steering actuator 7 is embodied by an electric power steering (EPS). When the control unit 5 requests the actuator 7 to generate the specific assist torque, a motor of the EPS is driven to generate the specific assist torque in the EPS, and the EPS assists the driver of the vehicle in changing the steering angle of the vehicle.

The brake actuator 8 is a motor-driven brake device or a hydraulic brake device provided for each of wheels of the vehicle. In the hydraulic brake device, a wheel cylinder of each wheel of the vehicle is automatically pressed by hydraulic fluid pressurized by a pump. When the control unit 6 requests the actuator 8 to generate the specific braking torque, a motor of the motor-driven brake device or a motor for driving the pump of the hydraulic brake device is driven to press the wheel cylinder, and a specific braking force corresponding to the specific braking torque is applied to the wheel.

The steering control unit 5 and the steering actuator 7 act as a steering control performing unit. The braking control unit 6 and the brake actuator 8 act as a braking control performing unit.

The requesting unit 1 has a lane keep control block, a lane departure control block, a pre-crash control block, a navigation cooperation assisting control block, and a turn assisting control block. Each control block of the requiring unit 1 determines a desired change pattern of a vehicle turning motion, and requires the control apparatus 10 to set a specific assist torque and/or a specific braking torque for the desired change pattern of the vehicle turning motion. In response to this request of one control block, the control apparatus 10 performs the steering control, the braking control or a cooperative control of the steering and braking controls. In the cooperative control, the steering and braking controls are cooperatively performed. Each control block executes an application program to determine the desired value of the vehicle turning motion.

For example, when the driver runs the vehicle on a highway extending straight, the lane keep control block controls an onboard camera to take a photograph of a front area of the vehicle by the camera, processes the photographed image to recognize a traveling line of the vehicle, and requests the control apparatus 10 to perform a lane keep control for a vehicle turning motion. Therefore, the vehicle runs along the traveling line. The lane departure control block recognizes lane markers indicating the area of the lane from the photographed image, calculates vehicle positions relative to the lane markers to judge whether or not the vehicle is placed out of the lane, and requests the control apparatus 10 to perform a lane departure control for a vehicle turning motion. Therefore, the vehicle is returned to the lane when the vehicle is placed out of the lane. The pre-crash control block calculates a deceleration and a changing level of the steering angle required to avoid collision with an object such as another vehicle located in front of the vehicle and requests the control apparatus 10 to perform a pre-crash control for a vehicle turning motion. Therefore, the vehicle is decelerated by the calculated deceleration and the driver is assisted in changing the steering angle by the calculated level for the purpose of avoiding the collision with the object. The navigation cooperation assisting control block detects a road sharply curved in front of the vehicle by using map data stored in a navigation device (not shown), and requests the control apparatus 10 to perform a navigation cooperation assisting control for a vehicle turning motion. Therefore, the vehicle smoothly runs on the curved road. The turn assisting control block requests the control apparatus 10 to perform a turn assisting control for a vehicle turning motion. Therefore, when turning the vehicle, the driver is assisted in changing the steering angle of the vehicle by a lower force.

When one control block of the requesting unit 1 produces a desired change pattern or behavior of the vehicle turning motion as a target of the vehicle motion control, the requiring unit 1 outputs a request signal indicating the desired change pattern to the control apparatus 10.

When one control block of the requesting unit 1 judges that the steering control is more important than the braking control to turn the vehicle while decelerating the vehicle, the requiring unit 1 outputs a selection of a steering control to the apparatus 10 and requests the apparatus 10 to mainly perform the steering control in the vehicle motion control and to support the steering control by the braking control, if necessary. In contrast, when one control block of the requiring unit 1 judges that the braking control is more important than the steering control to turn the vehicle while decelerating the vehicle, the requiring unit 1 outputs a selection of the braking control to the apparatus 10 and requests the apparatus 10 to mainly perform the braking control in the vehicle motion control and to support the braking control by the steering control, if necessary.

The control apparatus 10 has a control allocating unit 2, an assist torque setting unit 3 and a braking torque setting unit 4. The control allocating unit 2 receives the selection of the steering or braking control, mainly performed for the vehicle turning motion, from the requiring unit 1, receives the desired change pattern of the vehicle turning motion from the requiring unit 1, allocates the steering control and the braking control for the vehicle turning motion, determines a main requested value of a yaw rate, representing a controlled variable indicating the vehicle turning motion, from conditions of the vehicle such that the main requested value of the yaw rate is controllable in the control unit 5 to be generated in the steering actuator 7 in case of the selection of the steering control or such that the main requested value of the yaw rate is controllable in the control unit 6 to be generated in the actuator 8 in case of the selection of the braking control, and determines an auxiliary requested value (i.e., a non-main requested value) of the yaw rate, corresponding to the difference between the desired value of the vehicle turning motion and the main requested value of the yaw rate.

The assist torque setting unit 3 sets the specific assist torque corresponding to the main requested value of the yaw rate in case of the selection of the mainly-performed steering control or sets the specific assist torque corresponding to the non-main requested value of the yaw rate in case of the selection of the mainly-performed braking control.

The braking torque setting unit 4 sets the specific braking torque corresponding to the main requested value of the yaw rate in case of the selection of the braking control or sets the specific braking torque corresponding to the auxiliary requested value of the yaw rate incase of the selection of the steering control.

When receiving the selection of the steering control from the requiring unit 1, the allocating unit 2 judges whether or not the desired change pattern of the vehicle turning motion received from the requiring unit 1 can be performed only by the steering control. When judging that the desired change pattern can be performed only by the steering control, the allocating unit 2 outputs a first requested yaw rate to the assist torque setting unit 3 while outputting a fourth requested yaw rate set at zero to the braking torque setting unit 4. An assist torque corresponding to the first requested yaw rate is sufficient for the desired change pattern of the vehicle turning motion. Because of the reception of the yaw rate set at zero in the setting unit 4, the control system 100 does not perform any braking control for the vehicle, but the control system 100 performs the steering control for the vehicle with the steering and brake operations of the driver.

In the same manner, when receiving the selection of the braking control from the requiring unit 1, the allocating unit 2 judges whether or not the desired change pattern of the vehicle turning motion can be performed only by the braking control. When judging that the desired change pattern can be performed only by the braking control, the allocating unit 2 outputs a fourth requested yaw rate to the braking torque setting unit 4 while outputting a first requested yaw rate set at zero to the assist torque setting unit 3. A braking torque corresponding to the fourth requested yaw rate is sufficient for the desired change pattern of the vehicle turning motion. Because the setting unit 3 receives the yaw rate set at zero, the control system 100 does not perform any steering control for the vehicle, but the control system 100 performs the braking control for the vehicle with the steering and brake operations of the driver.

The allocating unit 2 further receives information about an upper limit of an assist torque, which is controllable by the control unit 5 so as to be generated in the steering actuator 7, from the control unit 5. In response to the selection of the steering control, the allocating unit 2 judges whether or not the assist torque limit is sufficient for the desired change pattern of the vehicle turning motion. When the assist torque limit is insufficient for the desired change pattern of the vehicle turning motion, the allocating unit 2 judges that the control system 100 cannot perform the desired change pattern of the vehicle turning motion only in the steering control without a support of the braking control. Therefore, the allocating unit 2 determines a first requested yaw rate (i.e., a main requested value of the yaw rate) corresponding to the assist torque limit as the main requested value of the yaw rate, outputs the first requested yaw rate to the setting unit 3, determines a fourth requested yaw rate (i.e., an auxiliary requested value of the yaw rate) from the difference between the desired change pattern of the vehicle turning motion and the first requested yaw rate, and outputs the fourth requested yaw rate to the setting unit 4 as the auxiliary requested value of the yaw rate.

The allocating unit 2 further receives information about an upper limit of a braking torque, which is controllable by the control unit 6 so as to be generated in the brake actuator 8, from the control unit 6. In response to the selection of the braking control, the allocating unit 2 judges whether or not the braking torque limit is sufficient for the desired change pattern of the vehicle turning motion. When the braking torque limit is insufficient for the desired change pattern of the vehicle turning motion, the allocating unit 2 judges that the control system 100 cannot perform the desired change pattern of the vehicle turning motion only in the braking control without a support of the steering control. Therefore, the allocating unit 2 determines a fourth requested yaw rate (i.e., a main requested value of the yaw rate) corresponding to the braking torque limit as the main requested value of the yaw rate, outputs the fourth requested yaw rate to the setting unit 4, determines a first requested yaw rate (i.e., an auxiliary requested value of the yaw rate) from the difference between the desired change pattern of the vehicle turning motion and the fourth requested yaw rate, and outputs the first requested yaw rate to the setting unit 3 as the auxiliary requested value of the yaw rate.

The allocating unit 2 further produces a control signal, indicating a calculation method corresponding to the selection of the steering or braking control, according to the selection signal, and outputs this control signal to each of the setting units 3 and 4.

In this embodiment, because the control system 100 performs the vehicle turning motion while controlling a yaw rate applied to the vehicle, a yaw rate value is determined in the allocating unit 2. However, because the control system 100 can also perform the vehicle turning motion while controlling another controlled variable such as a slip angle or a lateral acceleration of the vehicle, a slip angle value or a lateral acceleration value may be determined in the allocating unit 2 in place of the yaw rate value.

The assist torque setting unit 3 performs a feedback control and a feed forward control and sets a specific assist torque according to the first requested yaw rate and the control signal received from the allocating unit 2. The setting unit 3 has a selecting and calculating part 3a, a normative value setting part 3b, an actual yaw rate detecting part 3c, a feedback control part 3d, a feed forward control part 3e, an adding part 3f and an assist torque converting part 3g as operation components.

The calculating part 3a selects a calculation method according to the control signal, performs the selected calculation method for the first requested yaw rate to obtain a second requested yaw rate, and outputs the second requested yaw rate to the setting part 3b. For example, when the setting unit 3 receives the control signal, indicating a calculation method corresponding to the selection of the steering control, from the allocating unit 2, the part 3a outputs the first requested yaw rate (i.e., the main requested value of the yaw rate) to the setting part 3b as a second requested yaw rate, receives a third requested yaw rate outputted from the setting part 3b in response to the reception of the second requested yaw rate, calculates a first correction value denoting a difference between the first requested yaw rate (i.e., the main requested value of the yaw rate) and the third requested yaw rate, and outputs the first correction value to the setting unit 4.

In contrast, when the setting unit 3 receives the control signal, indicating a calculation method corresponding to the selection of the braking control, from the allocating unit 2, the part 3a receives a second correction value from the setting unit 4, adds the second correction value to the first requested yaw rate (i.e., the auxiliary requested value of the yaw rate) to obtain a second requested yaw rate, and outputs the second requested yaw rate to the setting part 3b.

The setting part 3b stores a normative model for the steering control, calculates a normative yaw rate (i.e., a first normative value) corresponding to the second requested yaw rate according to the normative model, and outputs the normative yaw rate to the control part 3d as a third requested yaw rate.

The normative model is set so as to match with characteristics of the vehicle. The difference between the second requested yaw rate and the normative yaw rate depends on response delay of the steering actuator 7, as described later in detail.

In this embodiment, the third requested yaw rate is set based on the normative model. However, because the setting part 3b merely sets a normative yaw rate, it is not necessary to set this normative yaw rate according to the normative model. For example, the setting part 3b may be formed of a filter to remove high frequency components from the second requested yaw rate. In this case, the part 3b sets the second requested yaw rate having no high frequency components as a normative yaw rate.

The detecting part 3c detects an actual yaw rate, at which the vehicle is actually turned, from a detection signal sent from a yaw rate sensor (not shown) in the current control period, and outputs data of this actual yaw rate as an actual physical value of the yaw rate. In this embodiment, because the yaw rate is adopted as a controlled variable indicating the vehicle turning motion, the actual yaw rate is detected as an actual physical value. However, when a slip angle or a lateral acceleration of the vehicle is adopted as a controlled variable, an actual slip angle or an actual lateral acceleration is detected as an actual physical value. Therefore, the detecting part 3c acts as an actual physical value detecting part for detecting and outputting an actual physical value of the adopted controlled variable.

The feedback control part 3d performs a feedback control such that the actual physical value detected in the part 3c approaches the third requested yaw rate of the part 3b in the succeeding control period. More specifically, the part 3d subtracts the actual yaw rate from the third requested yaw rate to obtain a yaw rate difference and calculates a feedback controlled yaw rate (i.e., a first feedback controlled value) corresponding to the yaw rate difference such that the yaw rate difference approaches zero when a change of the steering angle performed by the driver is assisted by an assist torque corresponding to the feedback controlled yaw rate in the succeeding control period. To calculate the feedback controlled yaw rate, a proportional integral and differential (PID) control for the general feedback control is performed.

The feed forward control part 3e performs a feed forward control for the second requested yaw rate outputted from the part 3a such that the actual physical value obtained in the part 3c approaches the second requested yaw rate. More specifically, the part 3e calculates a feed forward yaw rate corresponding to the second requested yaw rate such that the actual physical value approaches the second requested yaw rate when a feed forward assist torque corresponding to the feed forward yaw rate is applied to the actuator 7 to assist a change in the steering angle. This feed forward yaw rate denotes a feed forward control quantity. To calculate the feed forward yaw rate, a feed forward control generally used with the feedback control is performed.

The adding part 3f determines a final control value of the yaw rate from the feedback control quantity and the feed forward control quantity. A contribution of the feedback control quantity to the final control quantity and a contribution of the feed forward control quantity to the final control quantity are appropriately set in advance. More specifically, the part 3f adds a contribution portion of the feedback controlled yaw rate of the part 3d and another contribution portion of the feed forward yaw rate of the part 3e to obtain a final requested yaw rate.

The converting part 3g sets an additional assist torque corresponding to the final control quantity. More specifically, the part 3g converts the final requested yaw rate into an additional assist torque such that an actual yaw rate of the vehicle in the current control period approaches the final requested yaw rate when an assist torque actually applied to the EPS of the actuator 7 is changed by the additional assist torque in the succeeding control period. Then, the part 3g outputs a signal indicating the additional assist torque to the control unit 5. The sum of an assist torque actually applied to the actuator 7 in the current control period and the additional assist torque currently set is equal to the specific assist torque to be applied to the EPS of the actuator 7 in the succeeding control period.

The braking torque setting unit 4 performs a feedback control and a feed forward control and sets a specific braking torque according to the fourth requested yaw rate and the control signal received from the allocating unit 2. The setting unit 4 has a selecting and calculating part 4a, a normative value setting part 4b, an actual yaw rate detecting part 4c, a feedback control part 4d, a feed forward control part 4e, an adding part 4f and a braking torque converting part 4g as operation components.

The calculating part 4a selects a calculation method according to the control signal, performs the selected calculation method for the fourth requested yaw rate to obtain a fifth requested yaw rate, and outputs the fifth requested yaw rate to the setting part 4b. For example, when the allocating unit 2 selects the braking control mainly performed in the cooperative control, the part 4a outputs the fourth requested yaw rate (i.e., the main requested value of the yaw rate) to the setting part 4b as the fifth requested yaw rate, receives a sixth requested yaw rate outputted from the setting part 4b in response to the reception of the fifth requested yaw rate, calculates the difference between the fourth requested yaw rate (i.e., the main requested value of the yaw rate) and the sixth requested yaw rate as the second correction value, and outputs the second correction value to the part 3a of the setting unit 3.

In contrast, when the allocating unit 2 selects the steering control mainly performed in the cooperative control, the part 4a receives the first correction value from the block 3a of the setting unit 3, adds the first correction value to the fourth requested yaw rate (i.e., the auxiliary requested value of the yaw rate) to obtain a fifth requested yaw rate, and outputs the fifth requested yaw rate to the setting part 4b.

The setting part 4b stores a normative model for the braking control, calculates a normative yaw rate (i.e., a second normative value) corresponding to the fifth requested yaw rate according to this normative model, and outputs the normative yaw rate to the control part 4d as a sixth requested yaw rate. This normative model is set so as to match with characteristics of the vehicle. In this embodiment, the sixth requested yaw rate is set based on the normative model. However, because the setting part 4b merely sets a normative yaw rate, it is not necessary to set this normative yaw rate according to the normative model. For example, the setting part 4b may be formed of a filter to remove high frequency components from the fifth requested yaw rate. In this case, the part 4b sets the fifth requested yaw rate having no high frequency components as a normative yaw rate.

The detecting part 4c detects an actual yaw rate in the current control period, and outputs this actual yaw rate as an actual physical value of the yaw rate in the same manner as in the detecting parts 3c, and outputs this actual yaw rate as an actual physical value in the current control period. The detecting part 4c acts as an actual physical value detecting part in the same manner as the detecting parts 3c.

The feedback control part 4d performs a feedback control such that the actual physical value detected in the part 4c approaches the sixth requested yaw rate outputted from the part 4b. More specifically, the part 4d subtracts the actual yaw rate from the sixth requested yaw rate to obtain a yaw rate difference and calculates a feedback controlled yaw rate (i.e., a second feedback controlled value) corresponding to the yaw rate difference such that the yaw rate difference approaches zero when each wheel of the vehicle is controlled at a feedback braking torque corresponding to the feedback controlled yaw rate in the succeeding control period. This feedback controlled yaw rate denotes a feedback control quantity. To calculate the feedback controlled yaw rate, the PID control for the general feedback control is performed.

The feed forward control part 4e performs a feed forward control for the fifth requested yaw rate outputted from the part 4a such that the actual physical value obtained in the part 4c approaches the fifth requested yaw rate. More specifically, the part 4e calculates a feed forward yaw rate corresponding to the fifth requested yaw rate such that the actual physical value approaches the fifth requested yaw rate when each wheel of the vehicle is controlled at a feed forward braking torque corresponding to the feed forward yaw rate in the succeeding control period. This feed forward yaw rate denotes a feed forward control quantity. To calculate the feed forward yaw rate, a feed forward control generally used with the feedback control is performed.

The adding part 4f determines a final control quantity from the feedback control quantity and the feed forward control quantity. Contributions of the feedback control quantity and the feed forward control quantity to the final control quantity are appropriately set in advance. More specifically, the part 4f adds a contribution portion of the feedback controlled yaw rate of the part 4d and another contribution portion of the feed forward yaw rate of the part 4e to obtain a final requested yaw rate.

The converting part 4g performs a torque conversion for the final control quantity obtained in the adding part 4f to set an additional braking torque corresponding to the final control quantity. More specifically, the part 4g converts the final requested yaw rate into an additional braking torque to be applied to each wheel of the vehicle such that an actual yaw rate of the vehicle in the current control period approaches the final requested yaw rate when a braking torque actually applied to the wheel of the vehicle is changed by the additional braking torque in the succeeding control period. Then, the part 4g outputs a signal indicating the additional braking torque to the control unit 6. The sum of the braking torque actually applied to each wheel of the vehicle in the current control period and the additional braking torque currently set is equal to the specific braking torque to be applied to the wheel in the succeeding control period.

For example, when the braking force applied to each of inner wheels placed on the inner side in the turning motion of the vehicle is increased while the braking force applied to each of outer wheels placed on the outer side in the turning motion of the vehicle is maintained at a constant value, the additional braking torque to be applied to each inner wheel is set at a positive value, while the additional braking torque to be applied to each outer wheel is set at zero.

The reason that the additional assist torque and the additional braking torque are determined from the third requested yaw rate corresponding to the second requested yaw rate and the sixth requested yaw rate corresponding to the fifth requested yaw rate will be described.

Each of the actuators 7 and 8 delays responding to the request sent from the control unit 5 or 6. Therefore, the actuator 7 generates a pattern of an assist torque corresponding to a pattern of the third requested yaw rate changed with time in response to a requested assist torque corresponding to the second requested yaw rate, and the actuator 8 generates an assist torque corresponding to the sixth requested yaw rate in response to a requested assist torque corresponding to the fifth requested yaw rate. In this embodiment, to compensate for the response delay of the actuators 7 and 8, the additional assist torque denoting a change in the assist torque generated in the actuator 7 is determined from the third requested yaw rate, and the additional braking torque denoting a change in the braking torque generated in the actuator 8 is determined from the sixth requested yaw rate. Therefore, each of the actuators 7 and 8 can accurately generate the controlled assist torque or the controlled braking torque in response to the request sent from the control unit 5 or 6.

Further, when the steering control is selected, the additional assist torque is not determined from the first requested yaw rate equal to the second requested yaw rate but is determined from the third requested yaw rate. To compensate for the assist torque corresponding to the difference between the first and third requested yaw rates, the fourth requested yaw rate is corrected to the fifth requested yaw rate in the setting unit 4 by adding the corrected yaw rate equal to the difference to the fourth requested yaw rate, and the additional braking torque is determined from the fifth requested yaw rate. In the same manner, when the braking control is selected as a control mainly performed, the additional braking torque is not determined from the fourth requested yaw rate equal to the fifth requested yaw rate but is determined from the sixth requested yaw rate. To compensate for the braking torque corresponding to the difference between the fourth and sixth requested yaw rates, the first requested yaw rate is corrected to the second requested yaw rate in the setting unit 3 by adding the corrected yaw rate equal to the difference to the first requested yaw rate, and the additional assist torque is determined from the second requested yaw rate.

In this embodiment, the converting part 4g sets the additional braking torque to be added to the braking torque actually applied to the vehicle in the current control period. However, the converting part 4g may set the specific braking torque which is obtained by adding the additional braking torque to the braking torque actually applied to the vehicle in the current control period. Regardless whether the converting part 4g sets the additional braking torque or the specific braking torque, the brake actuator 8 generates the braking force corresponding to the specific braking torque in the succeeding control period.

The steering control unit 5 is embodied by a steering electronic control unit (ECU). In response to information of the additional assist torque sent from the setting unit 3, the control unit 5 produces a driving signal having an assist current corresponding to the additional assist torque and outputs this driving signal to the actuator 7 as a request of the additional assist torque. Therefore, the assist torque generated in the actuator 7 is changed by the additional assist torque in response to the driving signal.

Further, the control unit 5 sends information about a control limit of the assist torque, generable in the steering actuator 7, to the allocating unit 2. The assist torque limit is determined from vehicle conditions. For example, this limit is determined from a functional upper limit of the actuator 7 in the generation of the assist torque or an upper limit of the generated assist torque depending on conditions of constitutional parts of the vehicle such as the driving of an air conditioner consuming a high power and the decrease of power accumulated in a battery. The control unit 5 collects various pieces of information, required to determine the assist torque limit, through a local area network (LAN) of the vehicle, determines the assist torque limit according to the collected information, and outputs information about the assist torque limit to the allocating unit 2.

The braking control unit 6 is embodied by a brake ECU. In response to information of the additional braking torque sent from the setting unit 4, the control unit 6 produces a driving signal having a brake current corresponding to the additional braking torque for each wheel and outputs this driving signal to the actuator 8 of each wheel as a request of the additional braking torque. Therefore, the braking torque generated in the actuator 8 is changed by the additional braking torque in response to the driving signal.

Further, the control unit 6 sends information about a control limit of the additional braking torque generable in the brake actuator 8 to the allocating unit 2. The additional braking torque limit is determined from vehicle conditions. For example, this limit is determined from a limit of the additional braking torque, required to avoid wheel lock or skid occurring in dependent on conditions of the road, a functional limit of the actuator 8 in the generation of the braking torque, and a limit of the generated braking torque depending on conditions of constitutional parts of the vehicle such as the driving of an air conditioner consuming a high power, the decrease of power accumulated in a battery and the like. The control unit 6 collects various pieces of information, required to determine the braking torque limit, through the LAN of the vehicle, determines the braking torque limit according to the collected information, and outputs information about the braking torque limit to the allocating unit 2.

In this embodiment, the additional braking torque limit is determined for each wheel. However, a control limit of the specific braking torque generated for each wheel may be determined and outputted to the allocating unit 2.

Figure 2:
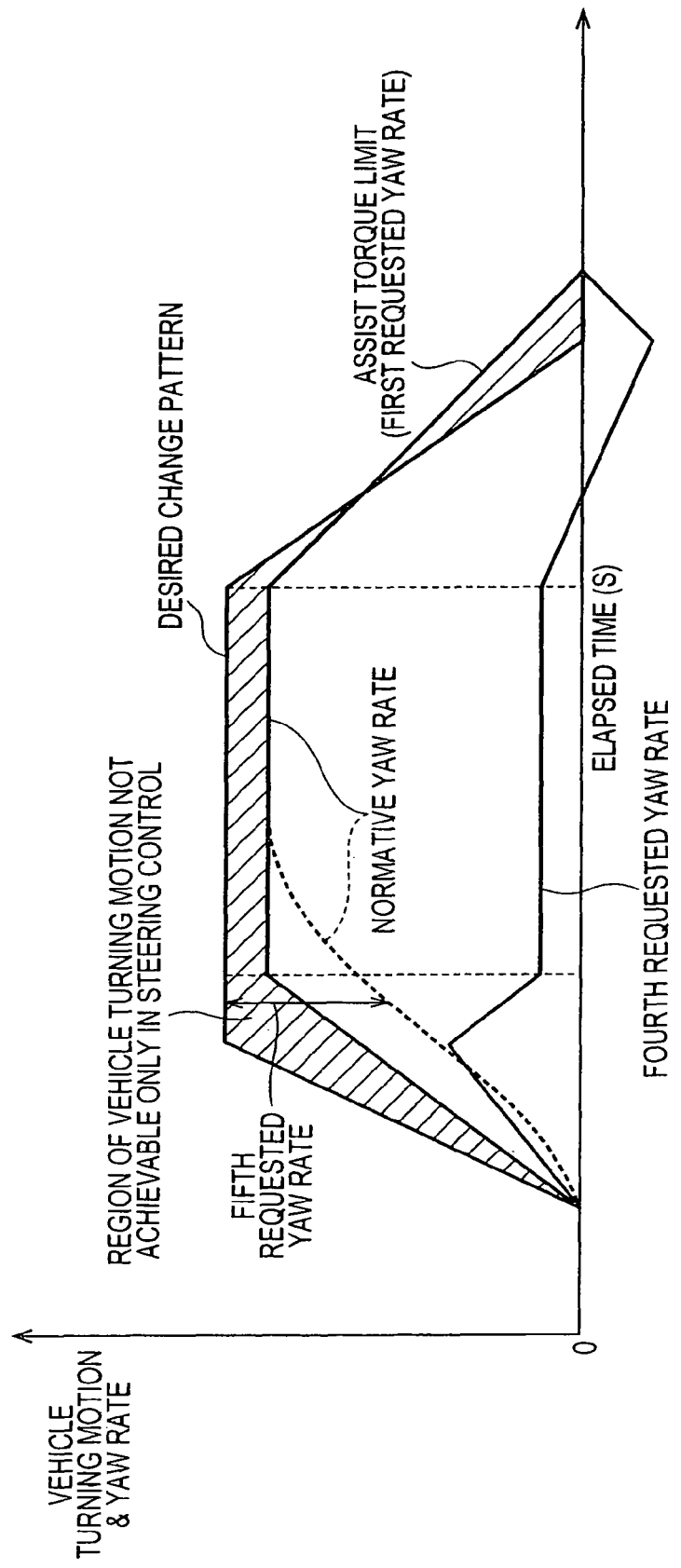
FIG. 2 is a timing chart of a cooperative control in which a steering control is mainly performed for the vehicle turning motion according to this embodiment.

Next, the cooperative control of the steering and braking controls performed in the control system 100 will be described. FIG. 2 is a timing chart of the cooperative control in which the steering control is mainly performed for the vehicle turning motion.

As shown in FIG. 2, one control block in the requiring unit 1 requests the control system 100 to perform a vehicle turning motion in the desired change pattern changed with time, and the control block selects a steering control and requests the control system 100 to mainly perform the steering control for the vehicle turning motion. The upper limit of the assist torque controllable by the control unit 5 for the steering control is lower than an assist torque, required for the desired change pattern, by a deficit changeable with time. The deficit is decided by subtracting the assist torque limit from the desired change pattern. Shadowed portions in FIG. 2 show the region corresponding to the deficit. This region of the vehicle turning motion is not achievable only in the steering control. In this case, assuming that only the steering control is performed for the vehicle turning motion, the actuator 7 cannot generate the assist torque required to perform the vehicle turning motion in the desired change pattern only in the steering control. Therefore, to support the steering control, the braking control is performed to compensate for the deficit in the vehicle turning motion. That is, the control system 100 performs the cooperative control of the steering and braking controls for the vehicle turning motion in the desired change pattern.

More specifically, when the requiring unit 1 outputs this desired change pattern of the vehicle turning motion and the selection of the steering control to the allocating unit 2, the allocating unit 2 judges based on the assist torque limit that the desired change pattern of the vehicle turning mot ion cannot be achieved only in the steering control, determines a first requested yaw rate corresponding to the assist torque limit, determines a fourth requested yaw rate corresponding to the deficit of the vehicle turning motion, outputs the first requested yaw rate to the setting unit 3, and outputs the fourth requested yaw rate to the setting unit 4.

In the setting unit 3, because of the selection of the steering control as a control mainly performed, the first requested yaw rate is set as a second requested yaw rate in the block 3a, and a third requested yaw rate corresponding to the second requested yaw rate is determined according to the normative model in the block 3b so as to be gradually changed with time, as compared with the second requested yaw rate. Because of the gradual change of the third requested yaw rate, the steering actuator 7 can reliably generate the assisting torque matching with the third requested yaw rate, regardless of the response delay of the actuator 7. Then, a feedback controlled yaw rate is determined from the actual yaw rate and the third requested yaw rate according to the feedback control in the block 3d, a feed forward yaw rate is determined from the second requested yaw rate according to the feed forward control in the block 3e, a final requested yaw rate is determined from the feedback controlled yaw rate and the feed forward yaw rate in the block 3f, and an additional assist torque is determined from this final requested yaw rate in the block 3g.

In the setting unit 4, because of the selection of the steering control as a control mainly performed, the sum of the fourth requested yaw rate and the difference between the first requested yaw rate (equal to the second requested yaw rate) and the third requested yaw rate is determined as a fifth requested yaw rate in the block 4a. This fifth requested yaw rate is equal to the difference between the desired change pattern and the third requested yaw rate. Because of the assist torque limit and the response delay of the actuator 7, the control system 100 cannot perform a portion of the vehicle turning motion corresponding to the fifth requested yaw rate only in the steering control. To perform this portion of the vehicle turning motion in the braking control, the fifth requested yaw rate is determined from the fourth requested yaw rate. Then, a sixth requested yaw rate corresponding to the fifth requested yaw rate is determined according to the normative model in the block 4b. Because of the gradual change of the fifth requested yaw rate, the sixth requested yaw rate is substantially equal to the fifth requested yaw rate. Then, a feedback controlled yaw rate is determined from the actual yaw rate and the sixth requested yaw rate according to the feedback control in the block 4d, a feed forward yaw rate is determined from the fifth requested yaw rate according to the feed forward control in the block 4e, a final requested yaw rate is determined from the feedback controlled yaw rate and the feed forward yaw rate in the block 4f, and an additional braking torque is determined from this final requested yaw rate in the block 4g.

Then, the assist torque generated in the steering actuator 7 is changed by the additional assist torque under control of the control unit 5, and the braking torque generated in the brake actuator 8 is changed by the additional braking torque under control of the control unit 6.

Figure 3:
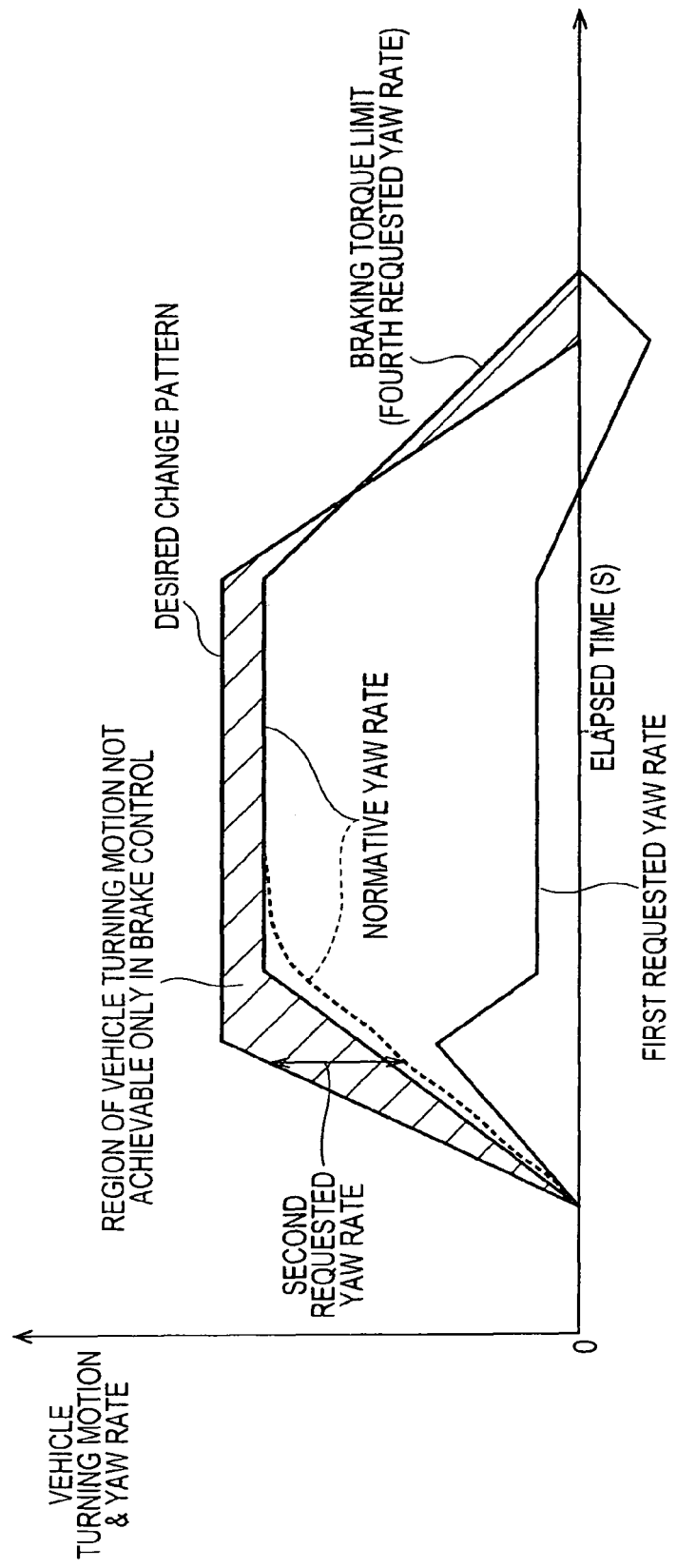
FIG. 3 is a timing chart of the cooperative control in which a braking control is mainly performed for the vehicle turning motion according to this embodiment.

FIG. 3 is a timing chart of the cooperative control in which the braking control is mainly performed for the vehicle turning motion.

As shown in FIG. 3, one control block in the requiring unit 1 requests the control system 100 to perform a vehicle turning motion in a desired change pattern or behavior changed with time, and the control block selects the braking control and requests the control system 100 to mainly perform the braking control for the vehicle turning motion. The upper limit of the braking torque controllable in the braking control of the control unit 6 is lower than a braking torque, required for the desired change pattern of the vehicle turning motion, by a deficit changeable with time. The deficit is decided by subtracting the braking torque limit from the desired change pattern. Shadowed portions in FIG. 3 show the region corresponding to the deficit. This region of the vehicle turning motion is not achievable only in the braking control. In this case, assuming that only the braking control is performed for the vehicle turning motion, the actuator 8 cannot generate the braking torque required to perform the vehicle turning motion in the desired change pattern only in the braking control. Therefore, to support the braking control, the steering control is performed for the deficit of the vehicle turning motion. That is, the control system 100 performs the cooperative control of the steering and braking controls for the vehicle turning motion in the desired change pattern.

More specifically, when the requiring unit 1 outputs this desired change pattern of the vehicle turning motion and the selection of the braking control to the allocating unit 2, the allocating unit 2 judges based on the braking torque limit that the desired change pattern of the vehicle turning motion cannot be achieved only in the braking control, determines a fourth requested yaw rate corresponding to the braking torque limit, determines a first requested yaw rate corresponding to the deficit of the vehicle turning motion, outputs the fourth requested yaw rate to the setting unit 4, and outputs the first requested yaw rate to the setting unit 3.

In the setting unit 4, because of the selection of the braking control as a control mainly performed, the fourth requested yaw rate is set as a fifth requested yaw rate in the block 4a, a sixth requested yaw rate corresponding to the fifth requested yaw rate is determined according to the normative model in the block 4b so as to be gradually changed with time, as compared with the fifth requested yaw rate. Because of the gradual change of the sixth requested yaw rate, the brake actuator 8 can reliably generate the assisting torque matching with the sixth requested yaw rate, regardless of the response delay of the actuator 8. Then, a feedback controlled yaw rate is determined from the actual yaw rate and the sixth requested yaw rate according to the feedback control in the block 4d, a feed forward yaw rate is determined from the fifth requested yaw rate according to the feed forward control in the block 4e, a final requested yaw rate is determined from the feedback controlled yaw rate and the feed forward yaw rate in the block 4f, and an additional braking torque is determined from this final requested yaw rate in the block 4g.

In the setting unit 3, because of the selection of the braking control as a control mainly performed, the sum of the first requested yaw rate and the difference between the fourth requested yaw rate (equal to the fifth requested yaw rate) and the sixth requested yaw rate is determined as a second requested yaw rate in the block 3a. This second requested yaw rate is equal to the difference between a yaw rate required for the desired change pattern of the vehicle turning motion and the sixth requested yaw rate. Because of the braking torque limit and the response delay of the actuator 8, the control system 100 cannot perform a portion of the vehicle turning motion corresponding to the second requested yaw rate only in the braking control. To perform this portion of the vehicle turning motion in the steering control, the second requested yaw rate is determined from the first requested yaw rate. Then, a third requested yaw rate corresponding to the second requested yaw rate is determined according to the normative model in the block 3b. Because of the gradual change of the second requested yaw rate, the third requested yaw rate is substantially equal to the second requested yaw rate. Then, a feedback controlled yaw rate is determined from the actual yaw rate and the third requested yaw rate according to the feedback control in the block 3d, a feed forward yaw rate is determined from the second requested yaw rate according to the feed forward control in the block 3e, a final requested yaw rate is determined from the feedback controlled yaw rate and the feed forward yaw rate in the block 3f, and an additional assist torque is determined from this final requested yaw rate in the block 3g.

Then, the braking torque generated in the brake actuator 8 is changed by the additional braking torque under control of the control unit 6, and the assist torque generated in the steering actuator 7 is changed by the additional assist torque under control of the control unit 5.

Assuming that only the steering control (or only the braking control) is automatically performed when the desired change pattern of the vehicle turning motion exceeds the assist torque limit (or the braking torque limit), the driver must manually perform a brake operation for a brake pedal and/or a steering operation for a steering wheel to compensate for the difference between the desired change pattern and the assist torque limit (or the braking torque limit). Therefore, a burden on the driver is extraordinarily increased.

However, in this embodiment, as described above, even when an assist torque (or a braking torque) required for the desired change pattern of the vehicle turning motion exceeds the assist torque limit (or the braking torque limit) in selection of the steering control (or the braking control), the control apparatus 10 sets the specific assist torque and the specific braking torque or sets the additional assist torque and the additional braking torque. Therefore, the control system 100 automatically performs the cooperative control of the steering and braking controls such that the braking control (or the steering control) performed at the specific braking torque (or the specific steering torque) supports the steering control (or the braking control) performed at the specific steering torque (or the specific braking torque). Accordingly, the control apparatus 10 can reliably control a vehicle turning motion such that the control system 100 performs the vehicle turning motion in the desired change pattern without inducing the driver to manually perform a brake operation and/or a steering operation. That is, a burden on the driver can be lightened.

Further, when the desired change pattern of the vehicle turning motion exceeds the assist torque limit or the braking torque limit, the steering control and the braking control are allocated for the vehicle turning motion to achieve the desired change pattern of the vehicle turning mot ion in the cooperative control. In the case of the selection of the steering control as a control mainly performed, the control apparatus 10 determines the first requested yaw rate from the assist torque limit, and the control apparatus 10 determines the fourth requested yaw rate from the deficit, obtained by subtracting the assist torque limit from an assist torque required for the desired change pattern. Therefore, the steering control can be mainly performed so as to apply the assist torque limit to the vehicle, and the braking control can be performed for the vehicle at a braking force corresponding to the fourth requested yaw rate so as to support the steering control. In contrast, in the case of the selection of the braking control as a control mainly performed, the control apparatus 10 determines the fourth requested yaw rate from the braking torque limit, and the control apparatus 10 determines the first requested yaw rate from the deficit, obtained by subtracting the braking torque limit from a braking torque required for the desired change pattern. Therefore, the braking control can be mainly performed so as to apply the braking torque limit to the vehicle, and the steering control can be performed for the vehicle at an assist torque corresponding to the first requested yaw rate so as to support the braking control.

Accordingly, the allocation of the steering control and the braking control for the vehicle turning motion can be appropriately performed, and the vehicle turning motion can be reliably performed in the cooperative control so as to precisely follow the desired change pattern.

Moreover, assuming that only the steering control (or only the braking control) is performed when a deficit between the desired change pattern and an assist torque (or a braking torque) applied to the vehicle in the steering control (or the braking control) still exists, the driver must perform a brake operation and/or a steering operation to compensate for the deficit. In this case, the manual operation of the driver sometimes delays responding to the required vehicle turning motion. However, in this embodiment, the control apparatus 10 sets the assist torque and the braking torque required for the cooperative control of the steering and braking controls such that the control system 100 can perform the vehicle turning motion in the desired change pattern. Accordingly, the control system 100 can reliably perform the steering control and the braking control without any delay in the response to the required vehicle turning motion, and the burden on the driver in the steering and brake operations can be lightened.

Furthermore, even when the actuators 7 and 8 have the response delay for the control of the control units 5 and 6, the control apparatus 10 sets the assist torque and the braking torque, to be applied to the vehicle in the cooperative control, so as to substantially avoid the response delay of the actuators 7 and 8. This effect will be described in more detail with reference to FIG. 4 and FIG. 5.

Figure 4:
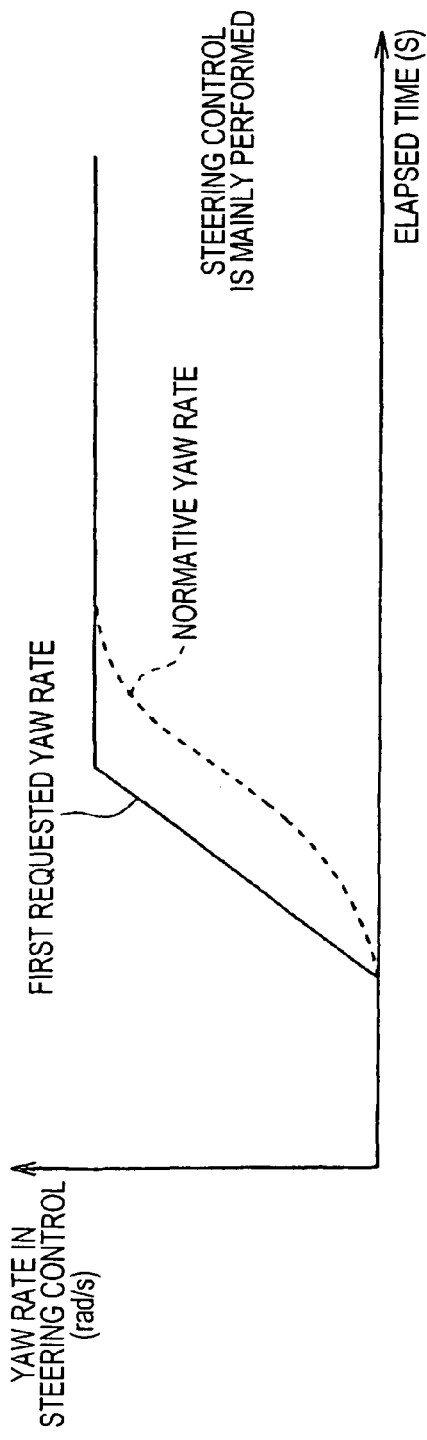
FIG. 4 is a view showing a normative yaw rate determined from a requested yaw rate so as to avoid response delay in a steering control according to this embodiment.

FIG. 4 is a view showing the normative yaw rate determined from the first requested yaw rate so as to avoid the response delay of the actuator 7 in the steering control. As shown in FIG. 4, assuming that the control unit 5 controls the actuator 7 to generate an assist torque corresponding to the first requested yaw rate, the actuator 7 generates an assist torque corresponding to the normative yaw rate (i.e., the third requested yaw rate) due to the response delay of the actuator 7. To precisely generate the assist torque in the actuator 7 under control of the control unit 5 in the steering control mainly performed in the cooperative control, the assist torque to be generated in the actuator 7 is determined from the third requested yaw rate. Accordingly, the control apparatus 10 can set the assist torque so as to be precisely generated in the actuator 7 under control of the control unit 5 without any response delay of the actuator 7.

Further, the assist torque generated in the actuator 7 is lessened by the difference between the first and third requested yaw rates, as compared with the assist torque corresponding to the first requested yaw rate determined in the allocating unit 2. To compensate for the assist torque corresponding to this difference, the corrected yaw rate equal to the difference is added to the fourth requested yaw rate to obtain the fifth requested yaw rate, and the braking torque to be generated in the actuator 8 is determined from the fifth requested yaw rate. Accordingly, the control apparatus 10 can set the assist torque and the braking torque in the cooperative control so as to precisely perform the vehicle turning motion in the desired change pattern.

In this embodiment, when the desired change pattern of the vehicle returning motion exceeds an assist torque limit, the control apparatus 10 sets the assist torque and the braking torque required for the cooperative control in which the steering control is mainly performed with the braking control performed to support the steering control. However, even when the desired change pattern is lower than an assist torque limit, because of the response delay of the actuator 7, the assist torque set for the steering control becomes insufficient to achieve the desired change pattern of the vehicle turning motion. Therefore, even when the desired change pattern is lower than an assist torque limit, it is preferred that the control apparatus 10 set the assist torque and the braking torque to perform the cooperative control in which the steering control is mainly performed. In this case, the normative yaw rate determined from the response delay of the actuator 7 denotes another braking torque limit. Further, to compensate for the assist torque corresponding to the difference between the first and third requested yaw rates, the control apparatus 10 sets the braking torque corresponding to this difference.

Figure 5:
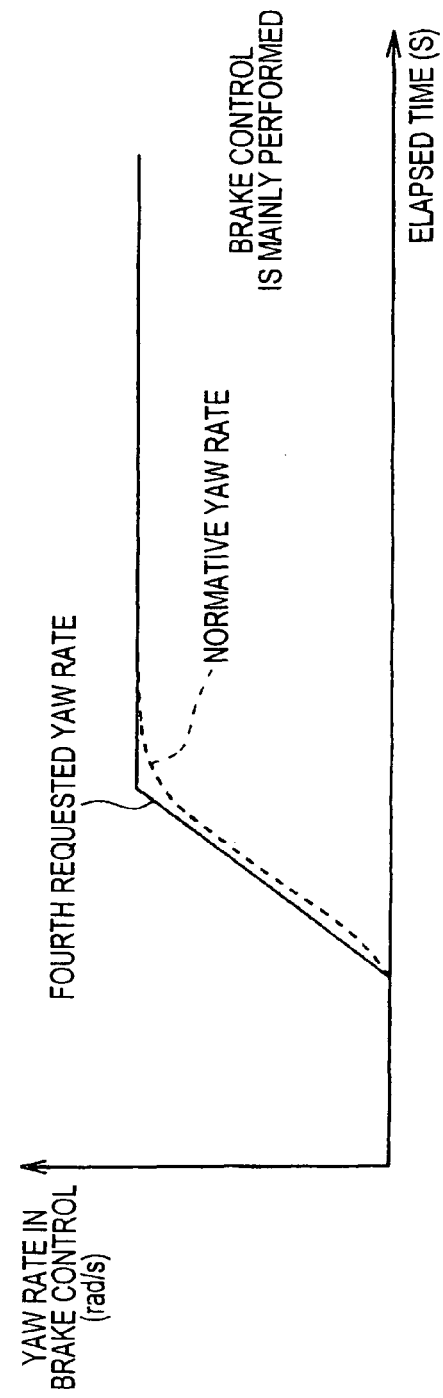
FIG. 5 is a view showing a normative yaw rate determined from a requested yaw rate so as to avoid response delay in a braking control according to this embodiment.

FIG. 5 is a view showing the normative yaw rate determined from the fourth requested yaw rate so as to avoid the response delay of the actuator 8 in the braking control. As shown in FIG. 5, assuming that the control unit 6 controls the actuator 8 to generate a braking torque corresponding to the fourth requested yaw rate, the actuator 8 generates a braking torque corresponding to the normative yaw rate (i.e., the sixth requested yaw rate) due to the response delay of the actuator 8. To precisely generate the braking torque in the actuator 8 under control of the control unit 6 in the braking control mainly performed in the cooperative control, the braking torque to be generated in the actuator 8 is determined from the sixth requested yaw rate. Accordingly, the control apparatus 10 can set the braking torque so as to be precisely generated in the actuator 8 under control of the control unit 6 without any response delay of the actuator 8.

Further, the braking torque generated in the actuator 8 is lessened by the difference between the fourth and sixth requested yaw rates, as compared with the assist torque corresponding to the fourth requested yaw rate determined in the allocating unit 2. To compensate for the braking torque corresponding to this difference, the corrected yaw rate equal to the difference is added to the first requested yaw rate to obtain the second requested yaw rate, and the assist torque to be generated in the actuator 7 is determined from the second requested yaw rate. Accordingly, the control apparatus 10 can set the braking torque and the assist torque in the cooperative control so as to precisely perform the vehicle turning motion in the desired change pattern.

In this embodiment, when a desired change pattern or behavior of the vehicle returning motion exceeds a braking torque limit, the control apparatus 10 sets the braking torque and the assist torque required for the cooperative control in which the braking control is mainly performed with the steering control performed to support the braking control. However, even when the desired change pattern is lower than a braking torque limit, because of the response delay of the actuator 8, the braking torque set for the braking control becomes insufficient to achieve the desired change pattern of the vehicle turning motion. Therefore, even when the desired change pattern is lower than a braking torque limit, it is preferred that the control apparatus 10 set the braking torque and the assist torque to perform the cooperative control in which the braking control is mainly performed. In this case, the normative yaw rate determined from the response delay of the actuator 8 denotes another braking torque limit. Further, to compensate for the braking torque corresponding to the difference between the fourth and sixth requested yaw rates, the control apparatus 10 sets the assist torque corresponding to this difference.

Figure 6B:
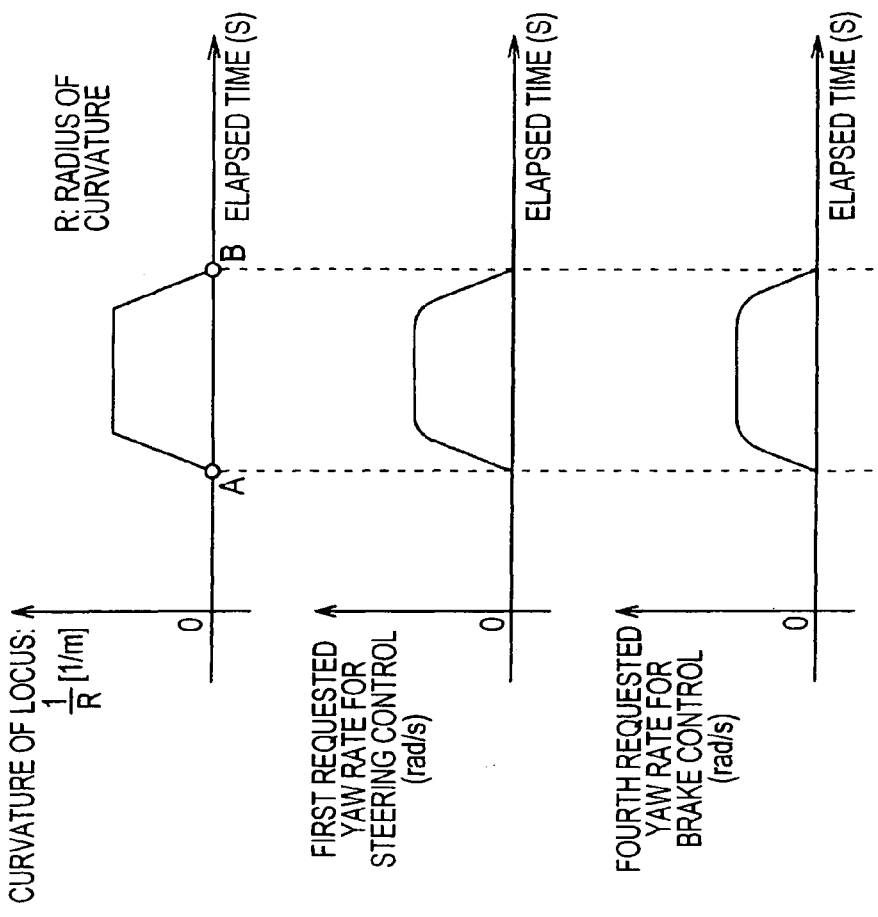
FIG. 6B is a timing chart showing a curvature of the running locus, a first requested yaw rate for the steering control and a fourth requested yaw rate for the braking control according to this embodiment.
Figure 6A:
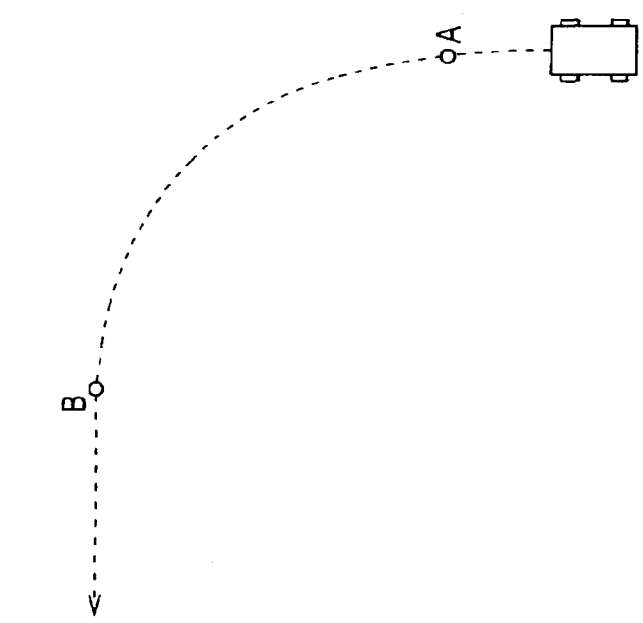
FIG. 6A is a top view of a desired running locus of a vehicle in the cooperative control according to this embodiment.

Next, an example of the cooperative control performed in the control system 100 will be described with reference to FIG. 6A and FIG. 6B. FIG. 6A is a top view of a desired running locus of a vehicle in the cooperative control, while FIG. 6B is a timing chart showing a curvature of the running locus, the first requested yaw rate for the steering control and the fourth requested yaw rate for the braking control.

As shown in FIG. 6A, it is planned to drive a vehicle between a point A and a point B along a road curved toward the left. In this case, the turn assisting control block of the requiring unit 1 determines a curvature of the running locus of the vehicle shown at the top of FIG. 6B, the allocating unit 2 selects the steering control mainly performed in the cooperative control, the setting unit 3 sets an additional assist torque from the first requested yaw rate shown in the middle of the FIG. 6B, and the setting unit 4 sets an additional braking torque from the fourth requested yaw rate shown at the bottom of the FIG. 6B. The control unit 5 controls the actuator 7 to change the generated assist torque by the additional assist torque in the steering control. To support this steering control, the control unit 6 controls the actuator 8 to change the generated braking torque by the additional braking torque in the braking control for each wheel of the vehicle. Because the steering control is mainly performed in the cooperative control, the first requested yaw rate is normally higher than the fourth requested yaw rate.

In this embodiment, the requiring unit 1 has the lane keep control block, the lane departure control block, the pre-crash control block, the navigation cooperation assisting control block, and the turn assisting control block. For example, when one control block requests a selection of the steering control, the steering control is mainly performed, and the braking control is performed to support the steering control. In contrast, when one control block requests a selection of the braking control, the braking control is mainly performed, and the steering control is performed to support the braking control. Therefore, in the same manner as in the example shown in FIG. 6A and FIG. 6B, the cooperative control of the steering and braking controls is performed so as to lighten the burden on the driver.

For example, when an object such as another vehicle suddenly drives out in front of the vehicle having the control system 100, the cooperative control of the steering and braking controls is performed, in response to the request from the pre-crash control block of the requiring unit 1, to avoid the collision with the object. For example, in this cooperative control, the steering control is mainly performed, and the braking control is performed to support the steering control. More specifically, not only the additional assist torque is added to the currently-generated assist torque to add a yaw rate to the vehicle in the steering control, but also the braking force is additionally applied to each inner wheel of the vehicle in the braking control during the turning of the vehicle.

Accordingly, the pre-crash control can be performed so as to precisely follow the desired change pattern of the vehicle turning motion, and the vehicle can be turned at a high performance while being decelerated. That is, the vehicle can quickly avoid the object, the braking control can perform the vehicle turning motion to compensate for the deficit denoting the difference between an assist torque required for the desired change pattern and the assist torque limit, and the burden on the driver in the steering and brake operations can be lightened.

Further, assuming that only the steering control is performed for the vehicle to apply a yaw rate or a change in the steering angle to the vehicle for the purpose of avoiding the collision with the object located in front of the vehicle, the steering control cannot be quickly performed for the vehicle at a high response. In addition, a high yaw rate cannot be applied to the vehicle when only the steering control is performed for the vehicle driven at a high speed. Therefore, the driver must manually decelerate the vehicle. However, in this embodiment, because the cooperative control is performed for the vehicle such that the braking control is performed for the vehicle to support the steering control, the control apparatus 10 can control the vehicle to ensure the desired yaw rate while being decelerated. Accordingly, the burden on the driver can be lightened.

Moreover, when a vehicle running on a downward path or running at an excess speed goes into a corner of a road, the control system 100 performs the cooperative control for the vehicle to turn the vehicle while decelerating the vehicle. For example, the control system 100 mainly performs the braking control and simultaneously performs the steering control so as to support the braking control. Therefore, the lane keep control block, the lane departure control block or the navigation cooperation assisting control block of the requiring unit 1 can appropriately control the vehicle. Accordingly, the control apparatus 10 can set the assist torque and the braking torque to perform the vehicle motion control while accurately following the desired change pattern of the vehicle turning motion, and the control apparatus 10 can control the vehicle turning motion so as to apply a higher deceleration performance and a higher turning performance to the vehicle, as compared with the case where only the braking control is performed for the vehicle. More specifically, in the cooperative control set in the control apparatus 10, the additional braking torque is added to the braking torque, currently applied to each wheel of the vehicle, in the braking control to appropriately apply the braking force to each wheel, and the additional steering torque is added to the vehicle in the steering control to appropriately apply a yaw rate to the vehicle. Therefore, a moment caused by the braking force assists the turning of the vehicle. Accordingly, the control apparatus 10 can control the vehicle turning motion so as to apply a higher deceleration performance and a higher turning performance to the vehicle. Further, because the steering control is performed with the braking control to assist the turning of the vehicle performed by the driver, the burden on the driver manually performing a steering operation can be lightened.

FIG. 7A is a timing chart showing a curvature in turning, an acceleration and a yaw rate applied to a vehicle only in the steering control according to the prior art, while FIG. 7B is a timing chart showing a curvature in turning, an acceleration and a yaw rate applied to a vehicle in the cooperative control according to this embodiment.

In the prior art shown in FIG. 7A, it is required to turn a vehicle along a curved running locus on a downward path while decelerating the vehicle, and only the steering control is performed to apply a yaw rate, used only for the turning of the vehicle, to the vehicle. When the vehicle is not decelerated, this yaw rate is insufficient to turn the vehicle. In this case, it is required that the driver manually performs a brake operation to decelerate the vehicle or manually performs a steering operation and a brake operation to apply a yaw rate, sufficient for the turning of the vehicle, to the vehicle and to decelerate the vehicle. Therefore, the burden on the driver is heavy.

In contrast, in this embodiment shown in FIG. 7B, when the navigation cooperation assisting control block of the requiring unit 1 detects a downward path sharply curved in front of the vehicle from map data of a navigation device and performs a navigation cooperation assisting control, the requesting unit 1 outputs a desired change pattern of a vehicle turning motion and the selection of the braking control to the control apparatus 10, and the control apparatus 10 controls the vehicle turning motion such that the vehicle is turned while being decelerated so as to form a running locus along the curved path. In this vehicle turning motion, the braking control is mainly performed to decelerate the vehicle, and the steering control is performed to support the driving of the vehicle decelerated in the braking control. In this case, by performing the steering control to turn the vehicle decelerated in the braking control, a yaw rate generated for the braking control can be applied to the vehicle. In other words, the yaw rate required to turn the vehicle can be distributed to the steering control and the braking control. Accordingly, not only the burden on the driver performing a brake operation can be lightened, but also the burden on the driver performing a steering operation can be lightened.

Modifications

In this embodiment, when the allocating unit 2 selects the steering control mainly performed in the cooperative control, the setting unit 3 sets the additional assist torque determined from the requested yaw rate corresponding to the assist torque limit. When the allocating unit 2 selects the braking control mainly performed in the cooperative control, the setting unit 4 sets the additional braking torque determined from the requested yaw rate corresponding to the braking torque limit. However, when the allocating unit 2 selects the steering control mainly performed in the cooperative control, the allocating unit 2 may determine a steering control yaw rate, which is lower than the requested yaw rate corresponding to the assist torque limit and is appropriate to the steering control, while considering vehicle operation conditions so as to set an additional assist torque corresponding to the steering control yaw rate in the setting unit 3. In the same manner, when the allocating unit 2 selects the braking control mainly performed in the cooperative control, the allocating unit 2 may determine a braking control yaw rate, which is lower than the requested yaw rate corresponding to the braking torque limit and is appropriate to the braking control, while considering vehicle operation conditions so as to set an additional braking torque corresponding to the braking control yaw rate in the setting unit 4.

For example, when the driver performs a steering operation for a steering wheel at a changing speed of the steering angle to change the steering angle, in response to the request from the turn assisting control block of the requiring unit 1, the allocating unit 2 receives the changing speed of the steering angle and a changed value of the steering angle as vehicle operation conditions, and determines a braking control yaw rate from the changing speed and the changed value to set an additional braking torque based on the braking control yaw rate in the setting unit 4.

Accordingly, because the braking control is automatically performed according to the changing speed of the steering angle and the changed value of the steering angle, the driver can easily perform the steering operation.

In conclusion, in the embodiment and modifications, to perform a vehicle turning motion by a desired value such as a desired change pattern, the control apparatus 10 selects the steering control or the braking control as a main control mainly or primarily performed in the cooperative control, sets the other control, not selected, as an auxiliary control (i.e., a non-main control) performed to support the main control, sets an assist torque or a braking torque, to be generated in the main control, by using a main requested value determined from vehicle conditions, and sets an assist torque or a braking torque, to be generated in the auxiliary control, by using an auxiliary requested value (i.e., a non-main requested value) determined from vehicle conditions. Therefore, the steering control and the braking control can be appropriately allocated for the desired change pattern of the vehicle turning motion. In this case, for the vehicle turning motion, the steering control can be mainly performed while the braking control is performed so as to support the steering control, or the braking control can be mainly performed while the steering control is performed so as to support the braking control. Accordingly, the desired value of the vehicle turning motion can be achieved while precisely following the desired value, as compared with the case where only the steering control or only the braking control is performed, and the cooperative control of the steering and braking controls can be performed so as to lighten the burden on the driver.

Further, in this embodiment, the control apparatus 10 sets the assist torque and the braking torque so as to substantially avoid the response delay in each of the actuators 7 and 8. However, the control apparatus 10 may set the assist and braking torques, regardless of the response delay in any actuator 7 or 8.

Moreover, in this embodiment, each of the setting units 3 and 4 performs the feedback control. However, to prevent the divergence of the requested yaw rate determined in the feedback control, only the setting unit corresponding to the main control may perform the feedback control, while the setting unit corresponding to the auxiliary control performs no feedback control.

This embodiment should not be construed as limiting the present invention to the structure of the embodiment and modifications, and the structure of this invention may be combined with that based on the prior art.

What is claimed is:

1. A vehicle motion control apparatus comprising:
   an assist torque setting unit which sets an assist torque and transmits a value of the assist torque to a steering control unit, wherein the assist torque is generated in the steering actuator by the steering control unit;
   a braking torque setting unit which sets a braking torque and transmits the value of the braking torque to a braking control unit, wherein the braking torque is generated in a braking actuator by the braking control unit; and
   a control allocation unit which
   receives a signal transmitted from any one of vehicle turning motion control applications mounted on a desired value request unit, the signal indicates a selected result selecting which of steering control and braking control is to be performed in the vehicle motion control apparatus,
   receives a desired value for vehicle turning motion from the desired value request unit,
   outputs a main request value for performing the selected control of either the assist torque setting unit or the braking torque setting unit according to the signal and the desired value, and
   outputs a difference value, the difference value being the difference between the desired value and the main request value as a non-main request value to another unit to which the main request value is not output, according to the signal and the desired value.

2. The vehicle motion control apparatus according to claim 1, wherein the control allocation unit
   outputs an assist torque limit value to the assist torque setting unit as the main request value and outputs the difference value between the desired value and the main request value to the braking torque setting unit as the non-main request value, in a case where the control apparatus performs the steering control, and
   outputs a braking torque limit value to the braking torque setting unit as the main request value and outputs the difference value between the desired value and the main request value to the assist torque setting unit as the non-main request value, in a case where the control apparatus performs the braking control.

3. The vehicle motion control apparatus according to claim 2, wherein
   the assist torque setting unit comprises:
   a first normative value setting part which sets a first normative value including a response delay against the request value outputted to the steering actuator,
   a first actual physical value detecting part which detects a first physical value actually applied to the vehicle,
   a first feedback control part which sets a first feedback control value on a basis of a difference between the first normative value and the first physical value, and
   an assist torque changing part which outputs the assist torque to the steering control unit on a basis of the first feedback control value, and
   the braking torque setting unit comprises:
   a second normative value setting part which sets a second normative value including a response delay against the request value outputted to the braking actuator,
   a second actual physical value detecting part which detects a second physical value actually applied to the vehicle,
   a second feedback control part which sets a second feedback control value on a basis of a difference between the second normative value and the second physical value, and
   a braking torque changing part which outputs the braking torque to the braking control unit on a basis of the second feedback control value.

4. The vehicle motion control apparatus according to claim 3, wherein the assist torque setting unit comprises a first calculating part which
   outputs the main request value to the first normative setting part and outputs the difference value between the main request value and the first normative value as a specific correction value to the braking torque setting unit in a case where the control apparatus performs the steering control, and
   outputs a value to which a specific correction value is added to the first normative value setting part in a case where the control apparatus performs the braking control, wherein the specific correction value is inputted from the braking torque setting unit to the non-main request value, and
   the braking torque setting unit comprises a second calculating part which
   outputs a value to which a specific correction value is added to the second normative value setting part in a case where the control apparatus performs the steering control, wherein the specific correction value is inputted from the assist torque setting unit to the non-main request value, and
   outputs the main request value to the second normative setting part and outputs the difference value between the main request value and the second normative value as a specific correction value to the assist torque setting unit in a case where the control apparatus performs the braking control.

5. The vehicle motion control apparatus according to claim 1, wherein
   when the control allocation unit has received a selected result indicating that the steering control is to be performed from an application for emergency avoidance against a collision with a sudden jumping out object located in front of the vehicle and then received a desired value from the desired value request unit, the control allocation unit outputs the main request value to the assist torque setting unit and also outputs the non-main request value to the braking torque setting unit, the assist torque setting unit transmits the assist torque based on the main request value to the steering control unit, and the braking torque setting unit transmits the braking torque based on the non-main request value to the braking control unit.

6. The vehicle motion control apparatus according to claim 1, wherein when the control allocation unit has received a selected result indicating that the braking control is to be performed from an application for performing speed reduction at the time of turning of the vehicle and then received a desired value from the desired value request unit, the control allocation unit outputs the main request value to the braking torque setting unit and also outputs the non-main request value to the assist torque setting unit, the braking torque setting unit transmits the braking torque based on the main request value to the braking control unit, and the assist torque setting unit transmits the assist torque based on the non-main request value to the steering control unit.

7. The vehicle motion control apparatus according to claim 1, wherein the vehicle turning motion control application is composed of at least one of lane keep control application, a lane departure control application, a pre-crash control application, a navigation cooperation assist control application, and a turn assist control application.

* * * * *